United States Patent
Paddock

[15] 3,653,423
[45] Apr. 4, 1972

[54] BONDING EPDM TO BUTADIENE RUBBERS

[72] Inventor: Charles F. Paddock, Wayne, N.J.
[73] Assignee: Uniroyal, Inc., New York, N.Y.
[22] Filed: May 13, 1970
[21] Appl. No.: 37,030

[52] U.S. Cl. ............................ 152/330, 156/308, 156/334, 161/252, 161/253, 260/879
[51] Int. Cl. .................. B32b 27/08, B60c 5/00, C08d 11/00
[58] Field of Search .......................... 161/253, 252; 260/879; 156/334; 152/330

[56] References Cited

UNITED STATES PATENTS

| | | | |
|---|---|---|---|
| 3,492,370 | 1/1970 | Wirth | 161/253 X |
| 3,240,843 | 3/1966 | Nelson | 260/878 |
| 3,344,105 | 9/1967 | McDonel et al. | 260/33.6 |

OTHER PUBLICATIONS

Rubber Handbook, R. T. Vanderbilt Co. Inc. 230 Park Ave. New York City 1958 Edition, frontispiece and page 169

*Primary Examiner*—John T. Goolkasian
*Assistant Examiner*—C. B. Cosby
*Attorney*—Bert J. Lewen

[57] ABSTRACT

A vulcanized composite laminate comprises a first layer of compounded EPDM rubber and a second compounded layer of butadiene-styrene rubber, a polybutadiene rubber or a blend of polybutadiene rubbers. The layers are bonded by depositing between them, prior to vulcanization, a graft copolymer consisting of an ethylene-propylene-ethylidene norbornene copolymer onto which has been polymerized butadiene and styrene; and a method of forming such composite rubber laminates.

10 Claims, No Drawings

BONDING EPDM TO BUTADIENE RUBBERS

This invention relates to a laminated polymeric article and a method of preparing the same.

More specifically, the instant invention teaches a method of laminating EPDM rubber to general purpose rubber and the article formed thereby. By this means ozone and weather resistant veneers may be adhered to tire sidewalls.

EPDM rubbers are unique in that they possess many of the properties of conventional general purpose elastomers such as emulsion copolymers of butadiene and styrene (SBR), natural rubber (NR), cis 1,4-polybutadiene and synthetic cis-1,4-polyisoprene, while at the same time being much less susceptible to hot air degradation, ozone degradation and weather checking than the conventional general purpose elastomers. This is believed to be the result of two factors — (a) lower degree of unsaturation in EPDM and (b) location of the unsaturation in short side chains rather than in the main polymer chain. The degree of unsaturation (per cent of the carbon to carbon linkages that are double bonds) in EPDM amounts to only a few per cent (2-5) as compared to 30-32 in the conventional rubbers. This disparity in degree of saturation results generally in differences in rate of vulcanization. Therefore, the cured adhesion of a 100 per cent EPDM compound to conventional rubber compounds is generally less than useful.

There are many applications of elastomers in which ozone resistance and resistance to weather checking are needed. Tire sidewalls, tire sidewall cover strips and garden hose covers are examples of such applications.

In accordance with the instant invention, it has been discovered that EPDM rubbers can be firmly adhered to conventional rubber compounds by selecting the appropriate EPDM rubber and coating the rubber surface with a cement as hereinafter described.

In order to obtain suitable adhesion, the EPDM rubber must be of the ethylidene norbornene type.

The preparation of such EPDM's is described in U.S. Pat. No. 3,151,173 and Belgian Pat. No. 697,049. Enough of the diene monomer units should be combined to cause the terpolymer to have an iodine number of at least 5 and in typical preferred polymers the value is 7 to 15. Higher amounts are also satisfactory, but they become uneconomical to produce. The weight percent of ethylene monomer units may be in the range of 40 to 80 percent, but in the typical preferred polymers, the range is 55 to 70 percent. Other commercially available EPDM rubbers, such as the 1,4-hexadiene or dicyclopentadiene type, cannot be used, except in minor amounts when blended with the aforesaid ethylidene norbornene type.

The cement used contains a graft copolymer having an ethylene/propylene/ethylidene norbornene rubber spine to which styrene and butadiene have been grafted.

To form the laminate, the two unvulcanized rubber surfaces to be joined are first coated with a thin layer of cement (e.g., 1 to 3 mils), the solvent allowed to evaporate, and then the plied assembly is cured under pressure.

The general purpose rubber compound may be an emulsion copolymer of butadiene and styrene, an alfin copolymer of butadiene and styrene, and blends of these with one another or with cis-polybutadiene. The polybutadiene or butadiene-styrene copolymers should have a total cis content of not more than 65 percent of the total cis, trans, and vinyl contents. The negative effect of cis-polybutadiene is completely unexpected and is not understood.

The ethylene/propylene/ethylidene norbornene (E/P/ENB) spine used in the graft polymerization is conventionally prepared in solution in an organic solvent. This solution, or a solution made by dissolving the solid E/P/ENB rubber spine in an organic solvent for this purpose, must first be converted into a latex if the grafting reaction is to be carried out by an emulsion process. Any suitable conventional method for converting the rubber solution (cement) into an aqueous dispersion may be used, such as that described in British Pat. No. 893,066. Preparation of latex from the cement typically involves emulsifying the cement in water and stripping off the solvent. The resulting dispersion may be concentrated and creamed by conventional procedures to produce a latex having a convenient solids content.

In the preparation of the graft copolymer by emulsion polymerization the butadiene and styrene monomers and an appropriate free radical source are added to a latex of the E/P/ENB rubber. The dispersion is then heated in order to polymerize the monomers and the grafted copolymer isolated in the usual manner by coagulation. Graft copolymers having from 2 to 45 wt percent of SBR, based on total weight of SBR and E/P/ENB, are effective in adhering E/P/ENB rubber and blends of E/P/ENB and EPDM rubbers to polydiene rubbers.

The adhesive cement is prepared by first forming a compounded graft copolymer stock. Compounding and vulcanizing ingredients are so chosen and are used in such amounts as to effect vulcanization of the polybutadiene to a vulcanizate having good properties; the selection of these ingredients and the determination of the amounts used are in accordance with principles well known to those skilled in the art of compounding and vulcanizing polybutadiene and EPDM rubbers.

Usually the cement stock thus prepared contains conventional loadings of fillers such as reinforcing channel (MPC or EPC) or furnace (HAF, SAF, etc.) carbon blacks or white reinforcing filler such as fine particle size hydrated silica and silicon dioxide. It may also contain extender oils customarily used in rubber compounding such as the paraffinic, aromatic or naphthenic type in an amount up to 100 parts per 100 parts of polymer. The reinforcing filler should be adjusted to 20 to 30 volumes of filler per 100 volumes of rubber plus oil.

The compounded graft copolymer stock is dispersed in a suitable organic solvent in the usual manner whereby the polybutadiene stock and other materials in the polybutadiene stock are dissolved or dispersed in the solvent according to their solubilities. If desired, tackifying resins such as those disclosed in U.S. Pat. No. 3,408,253 may also be added. The cement is so formulated as to contain from 3 to 20 parts by weight of total solids per 100 parts of the cement. The preferred range is 6 to 10. (The volatile organic solvent used as the vehicle in the cement can be any liquid having the requisite power of dissolving the polybutadiene compound and having appropriate volatility. Examples are cyclohexane, gasoline, trichloroethylene, n-hexane.)

An important feature of the rubber and cement compositions of the invention is the use of vulcanization accelerators that are approximately equally effective for E/P/ENB rubber and general purpose polybutadiene rubbers.

The preferred accelerators for vulcanizing the composites and the cement composition may be described generically by the following formula:

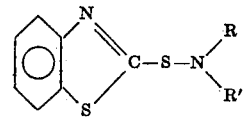

where R may be hydrogen or an alkyl radical having 1 to 20 carbon atoms; and R' may be an alkyl radical with 1 to 20 carbon atoms, a phenyl group; and R and R' may be a single aliphatic alpha, omega di-radical of 2 to 6 atoms, one or more of which may be a heteroatoms selected from the group consisting of oxygen, sulfur or nitrogen. Examples of the preferred accelerators include N-cyclohexylbenzothiazole-2-sulfenamide, 2-[(N-morpholino)thio]benzothiazole, and N,N-ditert-butylbenzothiazole-2-sulfenamide.

TESTING TECHNIQUE

For the purpose of determining good cured adhesion, adhesion test slabs are tested on the dynamic adhesion test using the apparatus described by F. H. D. Akkerman in the Journal of Applied Polymer Science, Vol. 7, pages 1425 (1963) without the photographic equipment. To prepare the sample, two slabs of the vulcanizable rubber stocks to be adhered together, measuring about 4 × 4 inches in area and from 0.1 to 0.2 inch in thickness, are cut from calendered sheets and one is superimposed on the other, a very thin sheet of plastic film such as Mylar polyester, being inserted between them over about one-half of their area. The directly contacting faces of the rubber pieces are first coated with the bonding cement. Pieces of nylon or rayon fabric are then laid against the top and bottom outer faces of the slabs. The composite is placed in a platen mold and vulcanized under heat and pressure. The vulcanized composite is then cut into strips 1 × 4 inches in such direction that half of each strip contains the plastic release sheet. The ends of the strip can then be pulled apart so that the sample has two legs joined to a unitary body of rubber, half the length of the sample, in which the two rubber stocks have become integrally united. The legs of the sample are clamped into the two sample-holding jaws of the machine at a constant predetermined distance from the line of partition between the two legs of the sample. The clamped sample is then pre-heated 15 minutes at the temperature of the test. The sample holder is then mounted in the oven of the machine maintained at the desired temperature, balanced inertia weights are applied, and the cam-operated oscillation is started, as described by Akkerman. A dial-type thickness gauge is mounted on the machine in such a manner as to permit a direct measurement of changes in the distance between the upper and lower sample jaws. The change in position of the lower jaw affords a measure of the resistance of the adhering rubber stocks to a separating pull. The test is run for 15 minutes at an oven temperature of 120° C, or until the sample completely separates and the time and extent of separation are recorded. The data are here reported as reciprocals of the rate of separation or specifically, the time in minutes to achieve an inch of separation calculated from the rate derived from the test. This method of treating the data has the advantage of showing the results as whole numbers increasing in magnitude as the degree of adhesion increases. For example, if a sample separated 0.25 inches in 15 minutes, the result would appear as 60 minutes/inch as reported here. Values equal to or greater than 30 minutes/inch indicate a level of adhesion which would be satisfactory for many rubber products including tires.

PREPARATION OF RUBBER STOCK

All the rubber compounds used in the experiments reported herein were made according to the following recipe:

TABLE I

|  | Parts by Weight |
| --- | --- |
| Polymer | 100 |
| Aromatic extender oil, ASTM Type 102 | 40 |
| Carbon Black, ASTM N–285 | 70 |
| N-isopropyl-N′-phenyl-p-phenylene diamine | 1 |
| Stearic Acid | 1 |
| Zinc Oxide | 5 |
| N-cyclohexylbenzothiazole-2-sulfenamide | 1 |
| Diphenyl guanidine | 0.3 |
| Sulfur | 2 |

The same recipe was used for the preparation of E/P/ENB rubber compounds used in adhesion test pads, the compounds used in making the cements and in the general purpose rubber compounds used in adhesion test pads.

The rubber compounds were prepared in the customary manner using a Banbury mixer to combine all of the ingredients except the last three which were added on a 2-roll rubber mill. The Banbury was heated with steam to attain a stock temperature of 150° C at the time it was dumped, which was usually about 10 minutes at 55 rpm in the laboratory "B" Banbury. The sulfur and accelerators were added on a 2-roll rubber mill at 125°–150° F.

A test slab, 6 in. × 6 in. × 100 in. was vulcanized for 30 minutes at 160° C and tested at 25° C for its stress-strain properties. A load at 300 percent extension in the range of 700 to 1,500 pounds per square inch was accepted as evidence that no serious error had been made in compounding and also as evidence that a satisfactory state of cure would be attained in the adhesion test slabs. This cure specification is met by EPDM rubbers which contain ethylidene norbornene but not by EPDM containing only 1,4-hexadiene or dicyclopentadiene as the termonomer for unsaturation. The last two are not sufficiently responsive to sulfenamide acceleration.

Sheets of the uncured compound having a thickness of 0.175 inch were prepared by passing the compound through a roll calender. These sheets were used in the construction of test slabs to determine the effectiveness of the various bonding cements.

PREPARATION OF GRAFT POLYMER

Two E/P/ENB latices were used to prepare the SBR to E/P/ENB graft copolymers described in this application. The first, E/P/ENB latex-1, was prepared in the following manner. One hundred parts of a 7.38 percent solution of the E/P/ENB polymer (percent Ethylene = 60, Iodine No = 10, and ML-4 at 212° F = 90) in commercial n-hexane and one hundred parts of aqueous soap solution containing 0.83 percent Sipex SB (sodium salt of lauryl sulfate, Alcolac Chemical Corp.) and 0.017 percent aqueous sodium hydroxide were pumped by means of positive displacement pumps through an in-line premixer into a Manton-Gaulin Model 4D colloid mill at 2 pounds per minute. The emulsion, thus formed, was recirculated three times through the colloid mill to assure uniformity.

In batch operation, one hundred pounds of this emulsion were then charged to a 20 gallon evaporator where the solvent was removed from the emulsion by heating with stirring. During the last stage of evaporation, the evaporator was evacuated to assure removal of all the solvent. This dilute latex was then concentrated to a solids content of 54.4 percent in a disk centrifuge.

The second latex, E/P/ENB latex-2, was prepared in the following manner. One hundred parts of a 7.6 percent solution of the same E/P/ENB polymer in commercial n-hexane and one hundred parts of aqueous soap solutions containing 0.78 percent lauric acid and 0.30 percent aqueous potassium hydroxide were pumped by means of positive displacement pumps through an in-line premixer into a Manton-Gaulin Model 4D colloid mill at 2 pounds per minute. The emulsion, thus formed, was recirculated three times through the colloid mill to assure uniformity. The latex was then stripped of solvent and concentrated in the manner described for E/P/ENB latex-1. The solids content was 50.0 percent.

Thereafter, the E/P/ENB latex, distilled water, free radical initiator, and styrene was charged into a glass bottle. After purging with nitrogen, the bottle was sealed using a cap containing a self-sealing liner. Liquid butadiene under pressure was added to the bottle through a hole in the cap and the bottle placed in a 50° C agitated water bath in order to polymerize the butadiene and styrene monomers. After removing the bottle from the water bath, the percent conversion of butadiene and styrene monomers to polymer was determined by measuring the solids content of the emulsion (drying a portion of the sample on a hot plate). After adding a combination of antioxidants [tri(nonylated phenyl) phosphite[1](1. Polygard, TM of Uniroyal, Inc.), alkylated bisphenol[2](2 Naugawhite, TM of Uniroyal, Inc.), and dilauryl thiodipropionate], the graft copolymer was recovered by flocculation with salt, washed, and dried in an air oven at 50° C. The recipes for the preparation of the SBR to E/P/ENB graft copolymers used in the examples of this application are given in the following table:

TABLE II.—PREPARATION OF GRAFT COPOLYMERS

|  | A | B | C | D | E | F | G | H | I |
|---|---|---|---|---|---|---|---|---|---|
| E/P/ENB Latex-1 (54.4% solids) | 73.5 |  | 73.5 |  |  |  |  |  | 73.5 |
| E/P/ENB Latex-2 (50.0% solids) |  | 80 |  | 110 | 140 | 80 | 170 | 140 |  |
| Distilled water | 266 | 260 | 266 | 245 | 230 | 260 | 215 | 230 | 266 |
| Lupersol 11 [1] |  |  | 1.5 |  |  | 1.5 |  |  | 1.5 |
| Vazo [2] | 1 | 1 |  | .75 | .5 |  | .25 | .5 |  |
| Styrene | 18 | 18 | 18 | 13.5 | 9 | 18 | 4.5 |  | 18 |
| Butadiene | 42 | 42 | 42 | 31.5 | 21 | 42 | 10.5 |  | 42 |
| Reaction temp., °C | 50 | 50 | 50 | 50 | 50 | 50 | 50 | 50 | 50 |
| Reaction time, hrs | 116 | 74 | 126 | 74 | 74 | 74 | 74 | 74 | 116 |
| Percent conversion | 68 | 47 | 38 | 51 | 53 | 5 | 26 |  | 35 |
| Antioxidants added. |  |  |  |  |  |  |  |  |  |
| Naugawhite | .06 | .14 | .06 | .16 | .18 | .09 | .18 | .14 | .06 |
| Polygard | .38 | .83 | .38 | .95 | 1.06 | .52 | 1.09 | .86 | .38 |
| Dilauryl thiodipropionate | .18 | .39 | .18 | .44 | .49 | .24 | .51 | .40 | .18 |
| SBR to E/P/ENB ratio | 50/50 | 41/49 | 37/63 | 30/70 | 18/82 | 7/93 | 4/96 | 0/100 | 34/66 |

[1] Free radical initiator—t=butyl peroxypivalate (Lucidol Division—Wallace and Tiernan, Inc.)
[2] Free radical initiator—azobisisobutyronitrile (E. I. duPont de Nemours & Co.)

PREPARATION OF CEMENT

Cements were made by dispersing the raw compound, made according to the above recipe, in cyclohexane. The proportions used were 6 grams of cement compound and 100 ml. cyclohexane. The procedure used in making cement was to take freshly milled stock, cut it into small pieces which were placed in the solvent and shaken vigorously overnight. Then the mixture was homogenized by use of a high speed Eppenbach Homo-mixer.

EPDM

Two different E/P/ENB elastomers were used in the following experiments. Their characteristics are tabulated below:

| EPDM | Wt. % Ethylene | Iodine No. | ML-4, 212° F. |
|---|---|---|---|
| A | 62 | 7 | 91 |
| B | 60 | 10 | 90 |

PREPARATION OF LAMINATE

The bonding cements were painted on the two slabs of vulcanizable rubber stocks, one containing E/P/ENB and the other containing a general purpose rubber such as SBR. After waiting 30 minutes for most of the solvent to evaporate, the two pieces were put together and vulcanized for 30 minutes at 320° F. The quality of adhesion was determined by use of the dynamic test described.

In order to illustrate the invention, the following examples are set forth:

In examples 1 through 13 a series of adhesion pads were made to test the bonding qualities of cements based on various elastomeric compositions. In each case EPDM (A or B) was used in one layer of the adhesion pad and Synpol 1712 (trademark) in the other. (Synpol 1712 is a synthetic rubber of butadiene and styrene made by Texas-U.S. Chemical Company containing 23± 1 percent styrene, 37.5 phr aromatic extender oil, and having a Mooney viscosity at 212° F of 43–55). EPDM-A was used in examples 1, 3, 9, 10 and 12 while EPDM-B was used in examples 2, & 4, 5, 6, 7, 8, 11, & 13.

In examples 1 through 7 the cements were based on SBR to E/P/ENB graft copolymers, while in example 8 the cement was based on an E/P/ENB polymer that had been heated in the presence of Vazo, and was identical to that used in example 5 except for the absence of SBR. The results 1 through 8 are tabulated below:

| Example | Graft Copolymer Used in Cement | SBR to E/P/ENB Ratio | Dynamic Adhesion at 250° F. min./inch |
|---|---|---|---|
| 1 | A | 50/50 | 0 |
| 2 | B | 41/59 | 92 |
| 3 | C | 37/63 | 62 |
| 4 | D | 30/70 | 48 |
| 5 | E | 18/82 | 58 |
| 6 | F | 7/93 | 52 |
| 7 | G | 4/96 | 57 |
| 8 | H | 0/100 | 0 |

Poor adhesion was obtained in examples 1 and 8 where the graft copolymers contained 50 percent and 0 percent SBR respectively. However, excellent adhesion was obtained in examples 2 through 7 where the graft copolymers contained from 4 to 41 percent SBR.

In example 9 the cement contained no polymer, while in examples 10 and 11 the cement was based on SBR (Synpol 1712) and EPDM-B respectively. The polymer cements used in examples 12 and 13 were based on physical blends of SBR (Synpol 1712) and EPDM-B and contained 50 and 37 percent SBR respectively. The results on examples 9 through 13 are tabulated below.

| Example | Polymer used in cement | Dynamic adhesion at 250° F., min./inch |
|---|---|---|
| 9 | none | 0 |
| 10 | SBR | 7 |
| 11 | E/P/ENB | 0 |
| 12 | 50% EPDM/50% SBR | 0 |
| 13 | 63% EPDM/37% SBR | 0 |

Poor adhesion was obtained in examples 9 through 13. Thus, neither SBR nor E/P/ENB alone nor blends of these polymers are effective in adhering SBR to E/P/ENB. Satisfactory adhesion is obtained only when the polymer in the cement is prepared by polymerizing SBR in the presence of E/P/ENB and only when the graft copolymer thus formed contains from approximately 2 percent SBR to approximately 46 percent SBR.

In examples 14 through 18 a cement based on SBR to E/P/ENB graft copolymer I containing 34 percent SBR was used to adhere EPDM-B to blends of two polybutadiene elastomers (polybutadiene A[(1)](1. "Taktene 1220" — Polymer Corporation, Sarnia, Canada.) containing 96 percent cis, 1 percent trans, and 3 percent vinyl and polybutadiene B[(2)](2. "Diene-45" — Firestone Tire and Rubber Company.) containing 15 percent cis, 68 percent trans, and 17 percent vinyl). In each case EPDM-B was used in one layer of the adhesion pad and a blend of polybutadienes A and B in the other. The results on examples 14 through 18 are tabulated below.

| Example | Ratio of Polybutadiene A to Polybutadiene B | % Cis in A/B Blend | Dynamic Adhesion at 250° F. min./inch |
|---|---|---|---|
| 14 | 0/100 | 15 | 71 |
| 15 | 25/75 | 35.2 | 79 |
| 16 | 50/50 | 55.5 | 62 |
| 17 | 75/25 | 75.8 | 0 |
| 18 | 100/0 | 96 | 0 |

These examples indicate that SBR to E/P/ENB graft copolymers are useful in adhering E/P/ENB to polybutadiene in cases where the cis content of the polybutadiene or polybutadiene blend is less than approximately 65 percent.

In examples 19 through 29 blends of different EPDM rubbers are adhered to SBR rubber stocks and blends of two polybutadiene rubbers containing widely different amounts of "cis" unsaturation. The cement copolymers also contain different SBR to E/P/ENB ratios. The results are set forth below.

| Example | Diene in EPDM rubbers | EPDM/E/P/ENB weight ratio in EPDM blends | SBR to E/P/ENB ratio in cement copolymer | Laminate rubber | | Dynamic adhesion at 250° F., mins./inch. |
|---|---|---|---|---|---|---|
| | | | | | PbteA/PbteB | |
| 19 | Dicyclopentadiene [1] | 20/80 | 41/59 | SBR | | 57 |
| 20 | Dicyclopentadiene [1] | 50/50 | 41/59 | | 0/100 | 41 |
| 21 | Dicyclopentadiene [1] | 70/30 | 41/59 | SBR | | 0 |
| 22 | Dicyclopentadiene [1] | 60/40 | 37/63 | | 25/75 | 42 |
| 23 | 1,4 hexadiene [2] | 50/50 | 37/63 | SBR | | 48 |
| 24 | 1,4 hexadiene [2] | 60/40 | 37/63 | | 50/50 | 38 |
| 25 | 1,4 hexadiene [2] | 20/80 | 30/70 | | 0/100 | 53 |
| 26 | Methyl tetrahydroindene [3] | 65/35 | 30/70 | SBR | | 0 |
| 27 | Methyl tetrahydroindene [3] | 70/30 | 7/93 | | 25/75 | 0 |
| 28 | Methyl tetrahydroindene [3] | 60/40 | 7/93 | SBR | | 40 |
| 29 | Methyl tetrahydroindene [3] | 20/80 | 18/82 | | 75/25 | 0 |

[1] Uniroyal Chemical "Royalene 302", an EPDM rubber containing 35 weight percent propylene, an Iodine Number of 13 and a Mooney viscosity (ML-4 at 212°F.) of 90.
[2] duPont "Nordel 1470" an EPDM rubber containing 43 weight percent propylene, an Iodine Number of 20 and a Mooney viscosity (ML 4 at 212°F.) of 85.
[3] Montecatini "Dutral S4090X2", an EPDM rubber containing 38 weight percent propylene, an Iodine Number of 19 and a Mooney viscosity (ML-4 at 212°F) of 92.

These examples show how SBR to E/P/ENB graft copolymers can be used to adhere blends of EPDM - E/P/ENB blends to either SBR or blends of polybutadiene wherein the cis content of the polybutadiene blend is less than approximately 65 percent and wherein the E/P/ENB content of the EPDM blend is at least 40 percent.

I claim:

1. A vulcanized composite laminate comprising a first layer of a compounded EPDM rubber selected from the group consisting of ethylene-propylene-ethylidene norbornene and blends of the foregoing with EPDM-type rubbers resulting from the copolymerization of a monomer mixture comprising two or more alpha-monoolefins with a minor amount of a diolefin, the amount of said ethylene-propylene-ethylidene norbornene copolymer in the blends being at least about 40 percent by weight, and a second compounded rubber layer wherein the rubber is a butadiene-styrene rubber, a polybutadiene rubber or a blend of polybutadiene rubbers, wherein the cis content of the polybutadiene rubber or of the blend is not more than 65 percent of the total cis, trans, and vinyl content, said first and second layers being bonded, prior to vulcanization of the composite laminate, through an intermediate layer of a compounded graft copolymer rubber deposited between said first and second layers, said graft copolymer consisting of an ethylene-propylene-ethylidene norbornene copolymer onto which has been polymerized butadiene and styrene, said laminate containing the products of a sulfur vulcanizing agent and a sulfenamide-type accelerator.

2. The composite laminate of claim 1 wherein at least about 55 percent of the total weight of the graft copolymer is ethylene-propylene-ethylidene norbornene copolymer.

3. The composite laminate of claim 1 wherein the butadiene and styrene are graft polymerized onto the ethylene-propylene-ethylidene norbornene copolymer in a weight ratio range of butadiene to styrene from about 2.0 to about 2.5.

4. The composite laminate of claim 1 wherein the first layer is butadiene-styrene rubber and the second layer ethylene-propylene-ethylidene norbornene rubber.

5. The composite laminate of claim 1 wherein the said first and second layers and the bonding intermediate layer each contain the products of vulcanizing amount of sulfur and an accelerating amount of a sulfenamide-type accelerator having the formula:

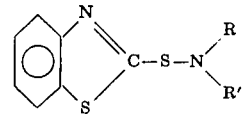

wherein R is hydrogen or an alkyl group having from 1 to 20 carbon atoms; R' is an alkyl group having from 1 to 20 carbon atoms or a phenyl group; or R and R' jointly are a single alpha, omega diradical having 2 to 6 atoms, one or more of which may be heteroatom selected from the group consisting of oxygen, sulfur or nitrogen.

6. A method of forming a composite rubber laminate by adhering the face surfaces of two compounded rubber sheets which comprises: coating at least one of the face surfaces with a solution of a graft compounded copolymer in a volatile organic solvent prepared by polymerizing styrene butadiene on an ethylene-propylene-ethylidene norbornene copolymer spine; evaporating the bulk of said solvent; contacting said face surfaces to form a laminate; and curing the resultant composite rubber laminate which contains a sulfur vulcanizing agent and a sulfenamide accellerator; one of said rubber sheets being an EPDM rubber selected from the group consisting of ethylene-propylene-ethylidene norbornene and blends of the foregoing with EPDM-type rubbers resulting from the copolymerization of a monomer mixture comprising two or more alpha-monoolefins with a minor amount of a diolefin, the amount of said ethylene-propylene-ethylidene norbornene copolymer in the blends being at least about 40 percent by weight, and the other being a butadiene-styrene rubber, a polybutadiene rubber or a blend of polybutadiene rubbers, wherein the cis content of the polybutadiene rubber or of the blend is not more than 65 percent of the total cis, trans and vinyl content.

7. The process of claim 6 wherein the two rubber sheets and the graft copolymer are cured in the presence of the same accelerator.

8. The process of claim 6 wherein the major portion of the graft copolymer is the ethylene-propylene-ethylidene norbornene spine.

9. A tire which comprises: (1) a sidewall composed of a compounded butadiene-styrene rubber, a compounded polybutadiene rubber or a compounded blend of polybutadiene rubbers, wherein the cis content of the polybutadiene rubbers or of the blend is not more than 65 percent of the total cis, trans, and vinyl content and (a) a veneer composed of a compounded EPDM rubber selected from the group consisting of ethylene-propylene-ethylidene norbornene and blends of the foregoing with EPDM-type rubbers resulting from the copolymerization of a monomer mixture comprising two or more alpha-monoolefins with a minor amount of a diolefin, the amount of said ethylene-propylene-ethylidene norbornene copolymer in the blends being at least about 40 percent by weight, said sidewall and veneer being bonded together by a cement containing a graft copolymer prepared by polymerizing butadiene and styrene on an ethylene-propylene-ethylidene norbornene copolymer spine; and said tire containing the products of a sulfur vulcanizing agent and a sulfenamide-type accellerator.

10. The tire of claim 9 wherein the sidewall is composed of compounded butadiene-styrene rubber and the veneer composed of compounded ethylene-propylene-ethylidene norbornene rubber.

* * * * *